United States Patent
Lin

(10) Patent No.: US 11,698,077 B2
(45) Date of Patent: Jul. 11, 2023

(54) REMOTE CONTROL SYSTEM FOR FORWARD/REVERSE ROTATION OF A FAN

(71) Applicant: Kuo-Tsun Lin, Taichung (TW)

(72) Inventor: Kuo-Tsun Lin, Taichung (TW)

(*) Notice: Subject to any disclaimer, the term of this patent is extended or adjusted under 35 U.S.C. 154(b) by 293 days.

(21) Appl. No.: 17/219,124

(22) Filed: Mar. 31, 2021

(65) Prior Publication Data

US 2022/0316489 A1  Oct. 6, 2022

(51) Int. Cl.
| | |
|---|---|
| *H02P 1/00* | (2006.01) |
| *F04D 27/00* | (2006.01) |
| *F04D 19/00* | (2006.01) |
| *G05B 19/4155* | (2006.01) |
| *H02P 3/20* | (2006.01) |
| *H02P 6/30* | (2016.01) |

(52) U.S. Cl.
CPC ......... *F04D 27/004* (2013.01); *F04D 19/005* (2013.01); *G05B 19/4155* (2013.01); *H02P 3/20* (2013.01); *H02P 6/30* (2016.02); *G05B 2219/31104* (2013.01); *G05B 2219/50333* (2013.01)

(58) Field of Classification Search
CPC ..................................... H02P 3/20; H02P 6/30
See application file for complete search history.

(56) References Cited

U.S. PATENT DOCUMENTS

2017/0207047 A1* 7/2017 Chang ................ H05B 47/19

FOREIGN PATENT DOCUMENTS

CN  2635954 Y * 8/2004

* cited by examiner

*Primary Examiner* — Karen Masih
(74) *Attorney, Agent, or Firm* — Birch, Stewart, Kolasch & Birch, LLP

(57) ABSTRACT

A remote control system for forward/reverse rotation of a fan includes a remote control and a forward-reverse rotation control unit. The remote control includes an operation module, and a first control module capable of outputting an operation signal which corresponds to an operation condition of the operation module. The operation signal can switch between a forward rotation mode and a reverse rotation mode to correspond to the operation condition of the operation module. The forward-reverse rotation control unit includes a double-pole relay that is controllable to switch between a first mode and a second mode and that is used to provide electric power to the fan, and a second control module that controls the double-pole relay to switch modes according to the operation signal, thereby making a rotational direction of the fan correspond to the operation of the operation module.

2 Claims, 1 Drawing Sheet

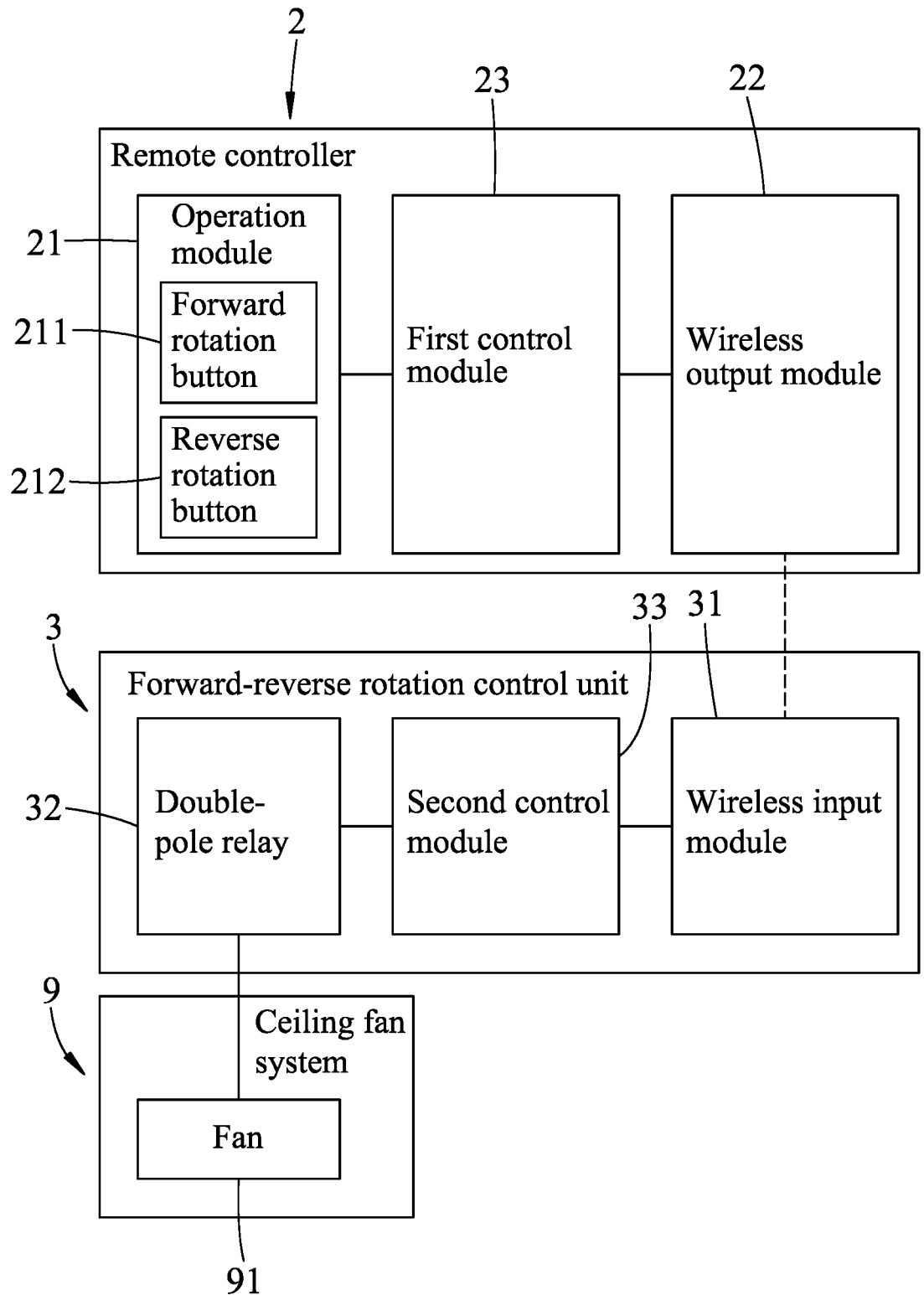

REMOTE CONTROL SYSTEM FOR FORWARD/REVERSE ROTATION OF A FAN

TECHNICAL FIELD

The invention relates to a fan, and more particularly to a remote control system for forward/reverse rotation of a fan.

PRIOR ART

A conventional ceiling fan system includes a fan, a remote control that is operable to send a switching signal, and a forward-reverse rotation control module that is used to receive the switching signal and that is electrically connected to the fan. The forward-reverse rotation control module can switch between a forward rotation mode, where it drives the fan to rotate forward, and a reverse rotation mode, where it drives the fan to rotate reversely. Upon receipt of the switching signal, the forward-reverse rotation control module switches from a current mode to the other mode, that is, to the reverse rotation mode when the current mode is the forward rotation mode, and to the forward rotation mode when the current mode is the reverse rotation mode.

In this way, a user can choose whether to operate the remote control to change a rotational direction of the fan based on a current rotational direction of the fan.

However, in a case that the fan is out of sight, for example, the fan is installed within a warehouse and the user has to remotely operate the fan from outside the warehouse where the user has no visual on the fan, the user would be unable to determine whether it is necessary to operate the remote control to change the rotational direction of the fan since the current rotational direction of the fan is unknown, and would be required to enter the warehouse to make this determination with the naked eye, which is inconvenient in use.

CONTENT OF INVENTION

Therefore, an object of this invention is to provide a remote control system for forward/reverse rotation of a fan that overcomes the drawbacks of the prior art.

Accordingly, the remote control system for forward/reverse rotation of a fan according to the invention is applied to a ceiling fan system. The ceiling fan system includes the fan. The remote control system for forward/reverse rotation of a fan comprises a remote control and a forward-reverse rotation control unit.

The remote control includes an operation module, a wireless output module, and a first control module that is electrically connected to the operation module and the wireless output module and that is capable of outputting, through the wireless output module, an operation signal which corresponds to an operation condition of the operation module. The operation signal is capable of switching between a forward rotation mode and a reverse rotation mode to correspond to the operation condition of the operation module. The forward-reverse rotation control unit includes a wireless input module that receives the operation signal in a wireless manner, a double-pole relay that is controllable to switch between a first mode and second mode and that is used to provide electric power to the fan, and a second control module that is electrically connected to the wireless input module and the double-pole relay and that controls the double-pole relay to switch modes according to the operation signal. The second control module controls the double-pole relay to switch to the first mode so as to make the fan receive electric power to rotate in a forward direction when the operation signal is in the forward rotation mode. The second control module controls the double-pole relay to switch to the second mode so as to make the fan receive electric power to rotate in a reverse direction when the operation signal is in the reverse rotation mode.

The effect of this invention resides in that: by setting up the operation module, the first control module, the double-pole relay and the second control module to make the electric power received by the fan correspond to the operation of the operation module, correctness of the rotational direction of the fan can be ensured, thereby enhancing convenience of use.

BRIEF DESCRIPTION OF DRAWINGS

Other features and effects related to the present invention will be clearly presented in the embodying manner with reference to the drawing, in which:

FIG. 1 is a system block diagram of an embodiment of a remote control system for forward/reverse rotation of a fan according to this invention.

EMBODYING MANNER

Referring to FIG. 1, an embodiment of a remote control system for forward/reverse rotation of a fan according to this invention is applied to a ceiling fan system 9. The ceiling fan system 9 includes the fan 91. The remote control system for forward/reverse rotation of a fan includes a remote control 2 and a forward-reverse rotation control unit 3.

The remote control 2 includes an operation module 21, a wireless output module 22, and a first control module 23 that is electrically connected to the operation module 21 and the wireless output module 22. In this embodiment, the operation module 21 has a forward rotation button 211 and a reverse rotation button 212 that can be operated; however, the operation module 21 is not limited thereto and can be a touch panel in other embodiments.

The first control module 23 can output, through the wireless output module 22, an operation signal that corresponds to an operation condition of the operation module 21. In this embodiment, the first control module 21 is a single chip, the operation signal can be in a form of a Wi-Fi signal, a Bluetooth signal or an infrared signal, but this invention is not limited thereto.

The operation signal can switch between a forward rotation mode and a reverse rotation mode to correspond to the operation condition of the operation module 21. In this embodiment, the operation signal is a digital code, and the digital code of the operation signal in the forward rotation mode is different from the digital code of the operation signal in the reverse rotation mode. For example, the digital code in the forward rotation mode is a binary code of 0101, and the digital code in the reverse rotation mode is a binary code of 0110, but this invention is not limited to such.

When the forward rotation button 211 is triggered, the first control module 23 controls the wireless output module 22 to output the operation signal that corresponds to the forward rotation mode. When the reverse rotation button 212 is triggered, the first control module 23 controls the wireless output module 22 to output the operation signal that corresponds to the reverse rotation mode.

The forward-reverse rotation control unit 3 includes a wireless input module 31 that receives the operation signal in a wireless manner, a double-pole relay 32 that is controllable to switch between a first mode and a second mode and that is used to provide electric power to the fan 91, and a second control module 33 that is electrically connected to the wireless input module 31 and the double-pole relay 32 and that controls the double-pole relay 32 to switch modes according to the operation signal.

The double-pole relay 32 is used to receive an input power, and output an output power that corresponds to the input power to the fan 91.

The output power and the input power have the same voltage polarity when the double-pole relay 32 is in the first mode, and the output power and the input power have opposite voltage polarities when the double-pole relay 32 is in the second mode. It should be explained that the technique of making the output power have the same or opposite voltage polarity with respect to the input power is easily understood by those skilled in the art, so the specification will not further illustrate the detailed circuit configuration.

When the operation signal is in the forward rotation mode, the second control module 33 controls the double-pole relay 32 to switch to the first mode, so as to make the fan 91 receive the electric power same as the input power and rotate in a forward direction. When the operation signal is in the reverse rotation mode, the second control module 33 controls the double-pole relay 32 to switch to the second mode, so as to make the fan 91 receive the electric power opposite to the input power and rotate in a reverse direction. In this embodiment, the second control module 33 is a single chip.

In use, when the forward rotation button 211 is triggered, the wireless output module 22 outputs the operation signal that corresponds to the forward rotation mode, thereby making the fan 91 rotate in the forward direction. When the reverse rotation button 212 is triggered, the wireless output module 22 outputs the operation signal that corresponds to the reverse rotation mode, thereby making the fan 91 rotate in the reverse direction.

Therefore, a rotational direction of the fan 91 inevitably corresponds to the forward direction button 211 and the reverse direction button 212 of the remote control 2, so the problem with the conventional technique that an actual rotational direction of the fan 91 has to be confirmed prior to determining whether to operate the remote control 2 does not exist. Accordingly, the remote control system for forward/reverse rotation of a fan can ensure that the rotational direction of the fan 91 is correct even under a circumstance where the fan 91 is out of sight, thereby enhancing convenience of use.

To sum up, by setting up the operation module 21, the first control module 23, the double-pole relay 32 and the second control module 33 to make the electric power received by the fan 91 correspond to the operation of the operation module 21, correctness of the rotational direction of the fan 91 can be ensured, thereby enhancing convenience of use. Therefore, the object of the invention can indeed be achieved.

However, the above are merely the embodiments of the present invention, and certainly the scope of the present invention cannot be limited thereby. Any simple equivalent variation and modification made according to the claims of the present invention and the contents of the patent specification should fall within the scope covered by a patent to the present invention.

DESCRIPTION OF REFERENCE NUMERALS

2: Remote Control
21: Operation Module
211: Forward Rotation Button
212: Reverse Rotation Button
22: Wireless Output Module
23: First Control Module
3: Forward-Reverse Rotation Control Unit
31: Wireless Input Module
32: Double-Pole Relay
33: Second Control Module
9: Ceiling Fan System
91: Fan

The invention claimed is:

1. A remote control system for forward/reverse rotation of a fan being applied to a ceiling fan system, the ceiling fan system including the fan, said remote control system for forward/reverse rotation of a fan comprising:

a remote control including an operation module, a wireless output module, and a first control module that is electrically connected to said operation module and said wireless output module and that is capable of, through said wireless output module, outputting an operation signal which corresponds to an operation condition of said operation module, the operation signal being capable of switching between a forward rotation mode and a reverse rotation mode to correspond to the operation condition of said operation module; and a forward-reverse rotation control unit including a wireless input module that receives the operation signal in a wireless manner, a double-pole relay that is controllable to switch between a first mode and a second mode and that is used to provide electric power to the fan, and a second control module that is electrically connected to said wireless input module and said double-pole relay and that controls said double-pole relay to switch modes according to the operation signal, said second control module controlling said double-pole relay to switch to the first mode so as to make the fan receive electric power to rotate in a forward direction when the operation signal is in the forward rotation mode, said second control module controlling said double-pole relay to switch to the second mode so as to make the fan receive electric power to rotate in a reverse direction when the operation signal is in the reverse rotation mode;

wherein said double-pole relay is used to receive an input power and to output an output power that corresponds to the input power to the fan, the output power and the input power have the same voltage polarity when said double-pole relay is in the first mode, and the output power and the input power have opposite voltage polarities when said double-pole relay is in the second mode.

2. The remote control system for forward/reverse rotation of a fan as claimed in claim 1, wherein the operation signal is a digital code, and the digital code of the operation signal in the forward rotation mode is different from the digital code of the operation signal in the reverse rotation mode.

\* \* \* \* \*